Patented Dec. 19, 1922.

1,439,291

UNITED STATES PATENT OFFICE.

JOHN COLLINS CLANCY, OF NIAGARA FALLS, NEW YORK, ASSIGNOR TO THE NITROGEN CORPORATION, OF PROVIDENCE, RHODE ISLAND, A CORPORATION OF RHODE ISLAND.

SYNTHESIS OF AMMONIA FROM ITS ELEMENTS.

No Drawing. Application filed January 7, 1920. Serial No. 349,953.

*To all whom it may concern:*

Be it known that I, JOHN COLLINS CLANCY, a subject of the King of Great Britain, residing at Niagara Falls, in the county of Niagara and State of New York, have invented certain new and useful Improvements in Snythesis of Ammonia from Its Elements, of which the following is a specification.

This invention relates to the synthesis of ammonia from its elements through the instrumentality of a catalyst possessing certain novel and particularly valuable properties and characteristics.

My disclosure herein, also concerns the production of said catalyst; the principal objects of my invention being to reduce the cost of production of the catalytic material, while at the same time increasing its hardiness or durability and thereby increasing its life when in use.

These and other objects of said invention will be hereinafter referred to and the novel combinations of steps in the process and of materials in the composition of matter which constitute the catalyst employed in said process, will be more especially pointed out in the claims appended hereto.

As I am aware of various modifications of and changes in my process and preferred catalyst, I desire to be limited only by the scope of said claims, broadly interpreted in the light of my disclosure.

In my application entitled: Ammonia synthesis and catalyst for effecting the same, Serial No. 346,320, filed December 20, 1919, I described a mode of producing active material from complex cyanogen bearing compounds such as calcium ferrocyanid, barium ferrocyanid, or potassium ferricyanid, etc.

In said application, the desirability of employing a distributive support for the catalytic material proper, was emphasized; as was also the mode of completing the preparation and, finally, the activating of said material after the substance from which it was formed had been completely freed from water. The activation was accomplished by particular heat treatment while the catalyst was surrounded by an atmosphere of mixed hydrogen and nitrogen.

I have now discovered that it is possible to start with identically the same substance, e. g., calcium ferrocyanid,—and by a somewhat analogous and yet essentially different mode of treatment, produce a catalyst possessing markedly different properties. By way of illustration: Starting with a concentrated solution of calcium ferrocyanid in water and sulfur-free and otherwise clean pumice lumps, preferably of about the size of peas or a trifle larger, I immerse the pumice in the solution and evaporate off the water while stirring the mass constantly.

After the charge to be treated has been well dried, preferably at about 100° C., it is then first placed in a preparing autoclave and its temperature is very gradually stepped up to about 350° C., during the course of a number of hours.

The operation thus far may be, and, in fact, desirably is, conducted at atmospheric pressure and the charge under treatment may be conveniently maintained in an atmosphere of mixed hydrogen and nitrogen; although hydrogen or nitrogen alone may be used. Air or free oxygen is, in any case, excluded; especially as the more elevated temperatures are approached, as even a trace of free oxygen or water is then highly injurious.

Thus far, the treatment corresponds closely with that which was described, to a like point, in my said co-pending application; but the treatment now to be described differs from what follows in said application, both in mode of operation and especially in results.

The heated material is now subjected to a current of ammonia gas, preferably under atmospheric pressure, to displace the hydrogen present in the pores of said material, and the temperature is slowly raised to, say, 400° C., or more; but never desirably above 650° C. In this treatment the need for great care in controlling the temperature, described in said application with special reference to the activation of the earlier catalyst, is however, now no longer required.

My new catalyst becomes active at a lower temperature than the one described in said application; to wit, at about 325° C., and it is capable of synthesizing ammonia from its elements even at this low temperature.

Said catalyst may moreover, be improved by departing further from the described treatment.

Thus, if instead of initially preparing the catalytic material, or catalyst-to-be, in an atmosphere of the synthesizing gases, it is subjected, even while being treated in the preparing autoclave, to an atmosphere of ammonia vapor, it becomes more hardy and resistant to deterioration when in use.

In fact it is so hardy and non-pyrophoric that when cooled to room temperature, it does not ignite upon exposure to the air.

On the other hand, the more sensitive catalyst (or class of catalysts) described in my said application, is highly pyrophoric after activation, even when at room temperature.

The present non-pyrophoric catalyst, prepared as aforesaid, may now be cooled and transferred to the working or synthesizing autoclave, with exclusion of air; but I prefer to eject it, while hot, directly from the preparing autoclave into the working autoclave, by a jet of the synthesizing gases,—air being of course carefully excluded during this transference.

The herein described treatment of the catalytic material, permits of elevating the temperature of the catalyst, under synthesizing conditions, to 500° C. or even to 600° C.; and the catalyst is not injured thereby. Here again, it distinguishes from my earlier catalyst, which if heated to, say, 550° C.,—and especially if heated above 600° C.,—under synthesizing conditions, becomes very seriously impaired, or it may be ruined, if said temperature be maintained for but a few hours.

The present catalytic bodies are more easily controlled; there being practically never any tendency for their temperatures to inadvertently run up if merely reasonable care be exercised in the control of the exothermic synthesizing reaction. They can be handled with less care; being far less delicate. They actively synthesize ammonia at lower temperatures; the preferred temperature in the present case being about 400° C., or somewhat less, rather than 450° C.; which, of course, prolongs the life of the autoclave. The preferred operating pressure is about one hundred atmospheres.

When using pure gases, the useful life of the catalyst described in my said application, is about twenty-five days, whereas catalysts of the class herein described are available for use, operating commercially, for forty days or more.

The preparation of my said earlier discovered catalyst must be conducted carefully and slowly; whereas the present catalyst, after the material from which it is formed in part, has been dried at temperatures ranging gradually up from 100° C. to 150° C., may then be subjected to the action of ammonia gas for but a few hours, at from 400° to 450° C., and thereupon be at once ready for the synthesizing operation.

The initial percentage yield from these catalysts, if both are operated at, say, 450° C., under the same conditions, is about the same; but the yield of the earlier catalyst falls off more rapidly and it requires occasional periods of rest; whereas the present ammonia-gas-treated catalyst does not thus tend to become fatigued, and its yield holds up for a much longer time. Toward the end of its life, the yield gradually falls, while with the earlier catalyst, there is usually an abrupt drop in yield as the end of its period of commercial usefulness is approached.

Also, the space-time yield of the new catalyst, herein described, is much greater; as the rate of flow of gases thereover can be greatly increased without injury to the catalyst.

Again, the earlier catalyst requires a distributive support such as pumice lumps; since, otherwise, it is too concentrated and being very sensitive, becomes over-heated unless the proper control of the temperature, favored by the support, is exercised. In the present catalyst, while the pumice support or the like is desirable, to afford porosity and to economize catalytic material, said support is by no means essential, as no exothermic reaction is involved in its preparation.

The exact composition of the replacement compounds formed by thus reacting with ammonia gas upon cyanogen compounds, or mixtures of compounds or substances one at least of which has initially a high cyanogen content, is exceedingly difficult to determine, and I am of the opinion that it is quite complex; being possibly in the nature of a complex salt including the groups $(CN)$ or $(CN_2)$, and $(NH_2)$ or $(NH)$. At any rate, there appears to be present therein after the finished product has been formed, not only nitrogen directly united to carbon by a plurality of bonds; but also, nitrogen free from direct connection with carbon.

During the treatment with the ammonia gas, there is a tendency to replace some of the nitrogen-carbon radicals in the catalyst in course of preparation, with nitrogen united directly to hydrogen, and if free hydrogen be present, hydrocyanic acid gas will be formed. Much of the cyanogen content of the mass will remain therein, however, if the temperature of the operation be not too high; and when free cyanogen, or HCN, is no longer liberated at a given operating pressure the catalyst is ready for use.

By way of further illustration, it will be well to state that when thus producing an addition compound by means of ammonia, I may start with not only the iron-cyanids previously mentioned, but, also, with such double salts as:

$K_4Cr(CN)_6$; $K_3Cr(CN)_6$; $CoCa[Fe(CN)_6]_2$; $K_3Mn(CN)_6$; $Ba_2Mn(CN)_6$; $K_4Mn(CN)_6$; etc.

Preferably, for convenience and cheapness of preparation of the catalyst, I start with such compounds, or mixtures of substances as the foregoing; because of their solubility in water; although insoluble compounds such as:

$K_4Ce(CN)_6$; $Sr_2Ti(CN)_6$; and the like, may be used.

These latter, however, do not permit of the ready formation therefrom, of films of catalytic material on pumice or the like, and they are, too, more costly.

The ammonia gas used in their treatment is preferably pure; but it may be diluted with non-harmful gas, such as the gaseous mixture of nitrogen and hydrogen used in the synthesizing operation; care being taken, in this case, to avoid such an excessive dilution of the ammonia as would impair its action upon the material under treatment. In general, the more concentrated the ammonia, the better.

The term "alkalinous metal" as used in certain of the appended claims is intended to refer to such metals as: calcium, strontium, barium, potassium, etc; this expression being employed to avoid circumlocution in said claims.

Some of these metals are mode adapted to the production of an efficient catalyst than others; the catalytically active metal, potassium, for example, being superior to sodium, and calcium being, likewise, greatly to be preferred to magnesium. I have particularly specified the preferred metals of this type, because such specified metals are both very well adapted to the purpose in question, and because, also, they are not rare or costly. Obviously this latter factor must be taken into consideration if the synthetic operation is to be of real value.

For analogous reasons, and because of the solubility of their cyanids, the auxiliary or less basic metal or metals, present in the complex catalyst, should desirably be either chromium, iron or manganese. Titanium, for example, is also well suited for use in my novel catalyst, except that cyanogen compounds thereof are insoluble in water and are, hence, more difficult to deposit to advantage upon the carrier preferably employed.

Having thus described my invention, what I claim is:

1. The process of producing ammonia which comprises synthesizing said ammonia from its elements through the intermediacy of a catalyst consisting of an alkalinous metal cyanogen compound which has been converted into non-pyrophoric active catalytic material by subjecting it to heat while in the presence of ammonia gas.

2. The process of producing ammonia which comprises synthesizing said ammonia from its elements through the intermediacy of a catalyst which includes nitrogen united directly to hydrogen, and carbon united directly to nitrogen, an alkalinous metal and a less basic metal adapted to co-act with the aforesaid constituents to constitute an active catalyst which is substantially free from any tendency to overheat when in use in the synthesizing operation.

3. The process of producing ammonia which comprises synthesizing said ammonia from its elements through the intermediacy of a catalyst consisting of a complex addition product resulting from the treatment of a double cyanogen salt with hot ammonia gas.

4. The process of producing ammonia which comprises synthesizing said ammonia from its elements through the intermediacy of a catalyst consisting of a complex addition product resulting from the treatment of a double cyanogen salt with hot ammonia gas, one of the base forming constituents of said double salt being an alkalinous metal and another of said constituents being a materially less basic metal, substantially as described.

5. The process of producing ammonia which comprises synthesizing said ammonia from its elements through the intermediacy of a catalyst consisting of a complex addition product resulting from the treatment of a water-soluble double cyanogen salt with hot ammonia gas.

6. The process of producing ammonia which comprises synthesizing said ammonia from its elements through the intermediacy of a highly porous catalytic body, the walls of the pores of which are coated with films of active catalytic material formed by reacting with ammonia gas upon cyanogen-bearing material in which a basic metal and a relatively non-basic metal are present, said basic metal being alkalinous in character.

7. The process of producing ammonia which comprises synthesizing said ammonia from its elements through the intermediacy of active catalytic material formed by reacting with ammonia gas upon cyanogen-bearing material in which a basic metal and a relatively non-basic metal are present, said basic metal being alkalinous in character.

8. The process of producing ammonia which comprises synthesizing said ammonia from its elements through the intermediacy of active catalytic material formed by reacting with ammonia gas upon cyanogen-bearing material in which a basic metal and chromium are present, said basic metal being alkalinous in character.

9. The process of producing ammonia which comprises synthesizing said ammonia from its elements by bringing the elements into contact with a non-pyrophoric catalyst formed from a cyanogen salt of an alkalinous metal and subjecting said elements to the influence of heat.

10. The process of producing ammonia, which comprises synthesizing said ammonia from its elements by bringing the elements into contact with a catalytically active material formed by treating a cyanogen salt of an alkalinous metal with hot ammonia gas.

11. The process of producing ammonia, which comprises synthesizing said ammonia from its elements by bringing the elements into contact with a catalytically active material formed by treating a cyanogen salt of an alkalinous metal with hot ammonia gas, and subjecting the said elements to the influence of heat and pressure.

In testimony whereof I have affixed my signature in the presence of two witnesses.

JOHN COLLINS CLANCY.

Witnesses:
E. J. PARENT,
ELSA VORWERT.